Sept. 8, 1936.　　　　S. V. COOK ET AL　　　　2,053,252
REFRIGERATING APPARATUS
Filed Nov. 25, 1930　　　6 Sheets-Sheet 1

Stanley V. Cook
Fredric L. Chase
INVENTOR

BY Spencer Hardman & Fehr
ATTORNEY

Sept. 8, 1936.  S. V. COOK ET AL  2,053,252
REFRIGERATING APPARATUS
Filed Nov. 25, 1930   6 Sheets-Sheet 2

Stanley V. Cook
Fredric L. Chase
INVENTOR

BY Spencer Hardman & Fehr
ATTORNEY

Sept. 8, 1936.  S. V. COOK ET AL  2,053,252
REFRIGERATING APPARATUS
Filed Nov. 25, 1930  6 Sheets-Sheet 3

Stanley V. Cook
Fredric L. Chase
INVENTOR

BY Spenser Hardman & Fehr
ATTORNEY

Sept. 8, 1936.　　　　S. V. COOK ET AL　　　　2,053,252
REFRIGERATING APPARATUS
Filed Nov. 25, 1930　　　6 Sheets-Sheet 4

Stanley V. Cook
Frederic L. Chase
INVENTOR

BY
Spencer Hardman & Behr
ATTORNEY

Sept. 8, 1936.    S. V. COOK ET AL    2,053,252
REFRIGERATING APPARATUS
Filed Nov. 25, 1930    6 Sheets-Sheet 6
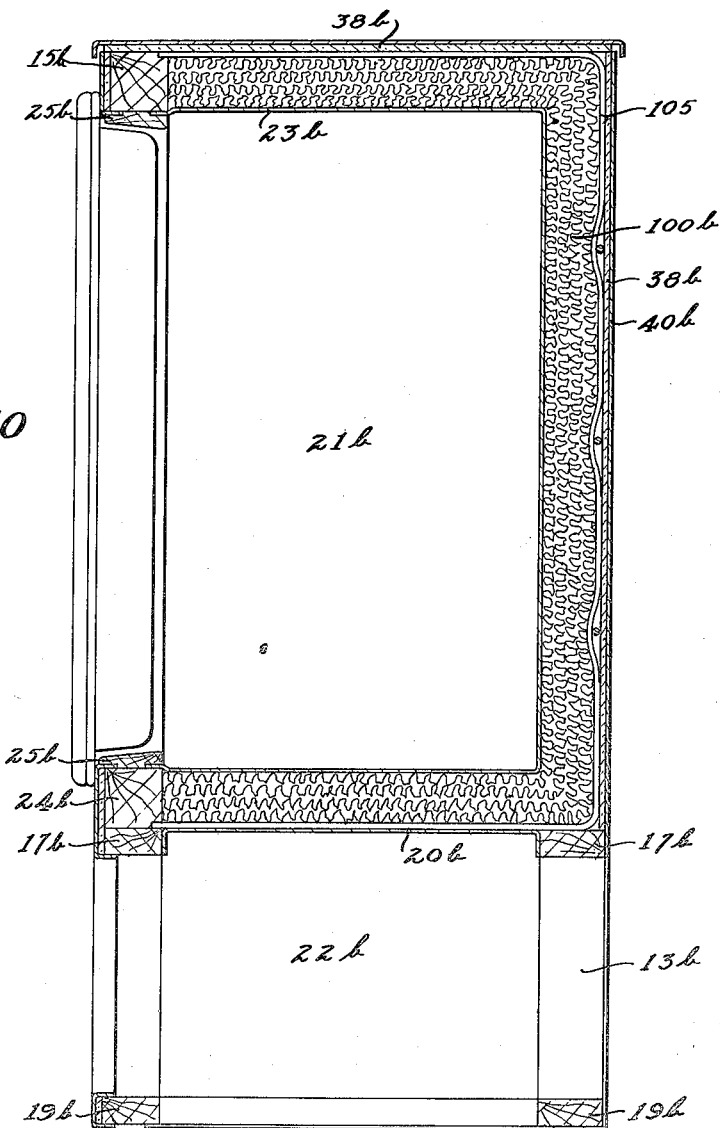
Fig. 10
Fig. 11
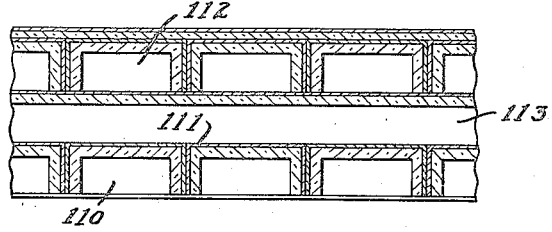
Stanley V. Cook
Fredric L. Chase
INVENTOR
BY
Spencer Hardman & Fehr
ATTORNEY Patented Sept. 8, 1936

2,053,252

UNITED STATES PATENT OFFICE 2,053,252

REFRIGERATING APPARATUS

Stanley V. Cook and Frederic L. Chase, Dayton, Ohio, assignors, by mesne assignments, to General Motors Corporation, a corporation of Delaware Application November 25, 1930, Serial No. 498,090

7 Claims. (Cl. 220—9)

This invention relates to refrigerating apparatus and more particularly to the construction of cabinets, the walls of which are heat insulated to prevent the passage of heat therethrough.

In the manufacture of insulated cabinets, it has been proposed to use air spaces in the walls thereof to prevent the transfer of heat therethrough. Heretofore such practice has been unsuccessful for the reason that radiant heat will pass freely through air, and in addition convection currents set up therein, will transfer large amounts of heat therethrough. It has been proposed to provide a dead air space bounded by a thin bright metal foil or leaf, such for instance as bright aluminum foil, for insulating purposes. By the term "metal foil" is meant thin leaves of metal of such thickness that they can be readily formed to any desired shape. It has been found that these bright metal surfaces of aluminum foil radiate but very little heat, and consequently it is possible to utilize air spaces lined with such bright surfaces in heat insulating cabinets. By reducing the size of the air space the other objectional feature of air space insulation, namely loss of heat by convection currents, is removed in that convection currents ordinarily set up are decreased to a minimum. In addition it has been found that air spaces bounded by such bright surfaces need not necessarily be made extra small in size or width to decrease the convection currents, for the reason that such convection currents are dependent to a great extent on radiant heat.

An attempt to adapt such thin metallic foil to cabinet construction so as to utilize air spaces in the walls thereof for insulating purposes have met with great difficulty. In the first place, this foil is extremely thin and consequently cabinets must be so constructed as to prevent rupturing of the foil when such cabinets are subjected to the slam test, a test involving the opening and closing of the cabinet door over prolonged periods of time. In addition, the foil must be so supported within the cabinet walls as to maintain it taut at all times, while at the same time preventing the transfer of heat through these supporting means. Thirdly, the foil being metal, has a tendency to rattle or cause what is known as a metallic cry and great care must be taken to prevent or render inaudible such cries or other noises.

It is to such structure that our invention particularly relates, having for one of its objects to provide a cabinet construction which will be capable of utilizing the thin metal foil to an advantage while at the same time eliminating all of its disadvantages. More particularly it is an object of this invention to provide a cabinet construction wherein all metallic cries are adequately deadened, rupturing of the foil is prevented, and a transfer of heat through the supporting members is eliminated.

A further object of this invention is to provide a substantially all metal cabinet, light and extremely durable in construction, yet having incorporated therein means for preventing almost entirely the transfer of heat from the exterior to the interior thereof.

Further objects and advantages of the present invention will be apparent from the following description, reference being had to the accompanying drawings, wherein a preferred form of the present invention is clearly shown.

In the drawings:

Fig. 10 is a vertical section through a cabinet showing another modification of our invention; and Fig. 11 is a detailed sectional view of a modified form of heat insulated wall.

Figure 1:
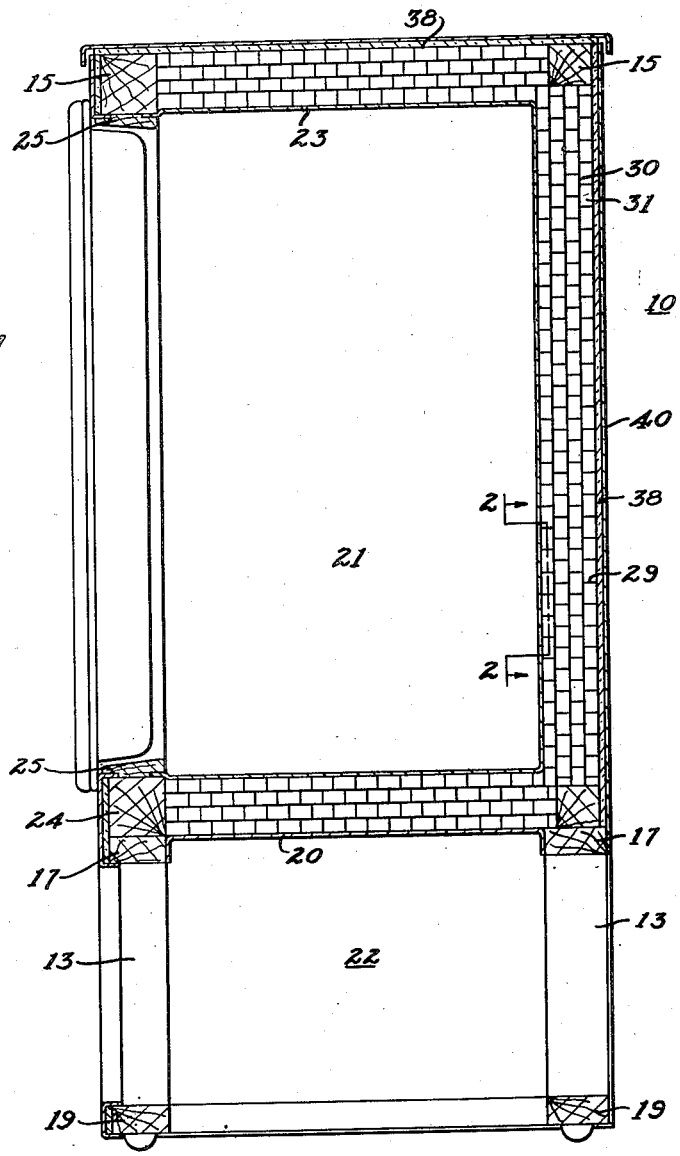
Fig. 1 is a vertical section taken through a cabinet embodying features of our invention.

In order to illustrate the various features of this invention, we have disclosed in Fig. 1 a refrigerator cabinet generally designated by the reference character 10. This cabinet has a frame construction of more or less conventional design. That is, it includes upright corner post members 13 having secured thereto the upper intermediate and lower cross beam members 15, 17, and 19 respectively. Secured to the intermediate cross beam members 17 is an inverted pan shaped metal plate member 20, the plate member 20 dividing the cabinet into a food storage compartment 21 and a machinery compartment 22. Within the food storage compartment 21 is provided a metallic lining 23, which lining may be a one piece metal lining insertable into the cabinet through the cabinet opening or insertable from the rear of the cabinet before the outer panels are assembled. The metal lining 23 is shown as secured to the upper cross beam member 15 and to the cross beam member 24 secured in turn to the intermediate front cross beam member 17. The metal lining 23 is also insulated from the outer metal lining of the cabinet by means of wood strips 25 shown as secured to the upper cross beam member 15 and to the intermediate cross beam member 24 with the lining 23 secured therebetween. It should be understood that the cabinet is provided with an outer metal covering in the usual manner.

Figure 2:
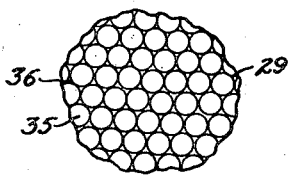
Fig. 2 is a section taken on the line 2—2 of Fig. 1.

The upper food compartment 21 is provided with insulated walls to prevent the transfer of heat therethrough. In Figs. 1 and 2 the walls of the food compartment 21 are shown as including a plurality of layers of thin metallic foil 30 spaced apart to provide air spaces 31. These spaces 31 may be of any thickness designed to prevent convection currents and it has been found that a thickness of substantially one-half inch for such air spaces gives satisfactory results. These layers of metal foil 30 are secured together in proper spaced apart relation by means of a plurality of tubes 29 of non-conducting material, which tubes are shown in this modification as being made of paper. In Figs. 1 and 2 these tubes are shown as cylindrical tubes and are cut so as to have a length equal to the width of the air space within which they are contained. That is, the space between the metal lining 23 and the first layer of aluminum foil 30, or the space between any two adjacent layers of aluminum foil 30, is divided up into a plurality of smaller air spaces by means of the cylindrical tubes. As shown in Fig. 2 each air space 31 is broken up into a plurality of air spaces 35 within the cylindrical tubes and into a plurality of air spaces 36 between the outside walls of the cylindrical tubes. Thus, there is provided a structure forming a base and support for the layers of aluminum foil and, in addition, a wall structure composed of many minute air spaces bounded on their two ends by the bright aluminum foil and on their sides by the non-conducting walls of the tubes. The edges of the air spaces, or, in other words, around the edges of the walls of the compartment 21, there may be provided a layer of asphaltic material for sealing the air spaces against the ingress of moisture.

The foil 30 being metallic, care must be taken to prevent the transfer of the so-called metallic cry from the walls thereof. To accomplish this purpose, we provide an exterior covering 38 of what is known as chip board or any other sound deadening material such as felt, asbestos, wall board, or the like. This material may be placed within the exterior panels of the cabinet so as to perform, in addition to its function of deadening the metallic cry, an additional function set forth hereinafter.

The wall structure may be built up in a very simple manner by first providing one layer of cylindrical tubes upon the outside surface of the metal lining 23 and then by laying on top of the layer of tubes a single sheet of aluminum foil which may be secured to the various wood frame members if desired by means of some asphaltic material. In addition, the outside surface of the metal lining 23 may also be covered with a layer of asphalt so as to seal the interior of the wall. The wall is thus built up by applying first one layer of tubes, then a sheet of aluminum foil, then a second layer of tubes, and so on. After the cabinet has been completely assembled, and the wall structure assembled as set forth above, the rear panel 40 may be secured to the upper cross beam members 15 and the intermediate cross beam members 17 in any conventional manner.

Either before the various panels are assembled or after the cabinet has been totally assembled, the panels forming the inner lining 23 and the outer metal covering of the cabinet may be coated with some finishing material such as porcelain to provide the proper finish. Thus, the chip board 38 which is located just within the outer porcelained metal covering of the cabinet will prevent the chipping of the enamel, and so forth.

It should be noted that the cabinet disclosed in Fig. 1, is constructed with a wood frame. However, the wood frame may be dispensed with and the cabinet may be made substantially all metal, since the lightness of the insulating material will offset the weight of the metal frame members.

Figure 3:
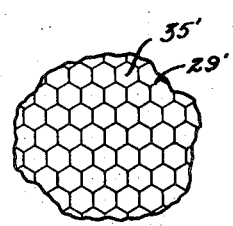
Fig. 3 is a section taken on the line similar to the line 2—2 of Fig. 1 showing a modified form of our invention.

Fig. 3 shows a slightly modified form of wall structure wherein the tubes are of a hexagonal shape so that they may be nested closely. In this modification, the air spaces 31 are broken down into a plurality of air spaces 35' within the interior of the tubes 29, while the spaces corresponding to the spaces 36 disclosed in Fig. 2 are eliminated.

Figure 4:
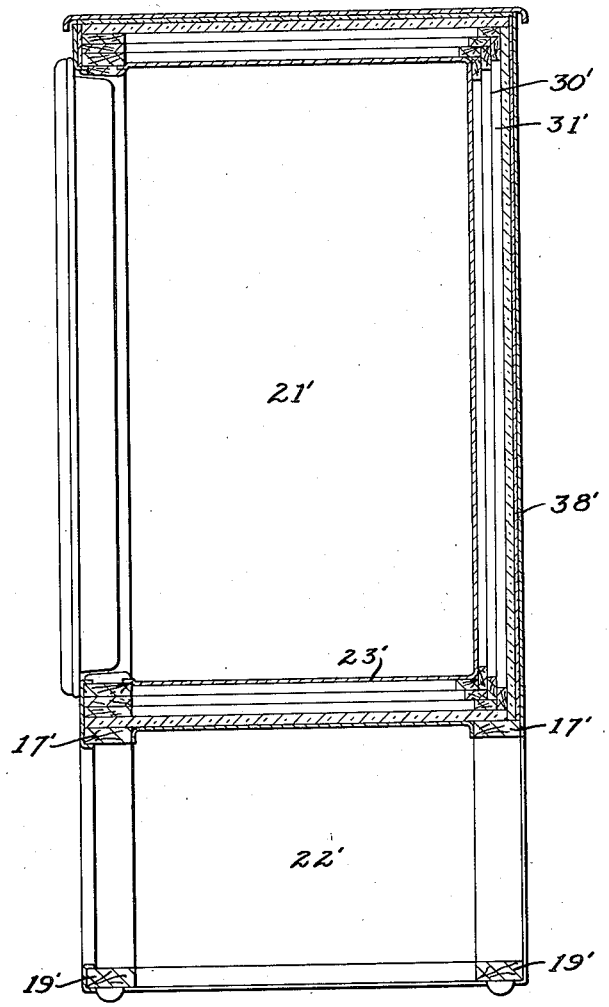
Fig. 4 is a vertical section through a cabinet showing a modified form of our invention.
Figure 5:
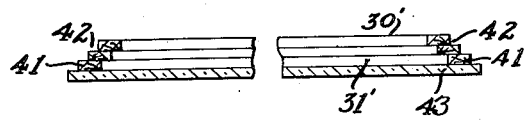
Fig. 5 is an enlarged sectional view through the unitary assembly forming the wall structure.

Referring to Fig. 4, we have disclosed a modified form of wall structure, and a slightly modified form of cabinet construction. In Figs. 4 and 5 the parts corresponding to similar parts in Figs. 1, 2, and 3 have been designated by the same reference character prime. In this modification, the walls of the refrigerated compartment 21' are insulated in substantially the same way. That is, each wall is built up of a plurality of layers of thin bright metallic foil 30' forming therebetween a plurality of air spaces 31'. Each side of the cabinet, however, is built up of insulating material which may be assembled as a unit before it is applied to the refrigerator. For instance, as disclosed in Fig. 5, each wall is composed of a sheet of non-conducting material 43 having secured thereto a plurality of blocks 41 of non-conducting material, herein shown as of wood, the blocks being arranged in stepped relation as shown at 42. Between the blocks 41 there is provided a sheet or layer of bright aluminum or other metal foil 30' secured to the blocks 41 in any convenient manner, for instance, by means of a paste. Each wall of the cabinet is composed of insulating material, built up in substantially the same way so that upon assembling, stepped edges of one side of the cabinet will fit within the stepped edges of the adjacent side of the cabinet. For instance, the top wall structure of the compartment 21' is provided with stepped rear edges to cooperate with the stepped upper edges of the rear wall structure and also with stepped side edges to coincide with the stepped upper edges of the side wall structure.

Thus, in this modification the wall structure is composed of a plurality of air spaces 31' bounded on substantially all sides by the bright metallic aluminum foil 30'. In addition, each wall structure may be assembled as a unit before it is applied to the refrigerator cabinet. In this modification, as well as that shown in Figs. 1 and 2, the wall structure is provided with the chip board 38' located immediately within the outer panels of the cabinet for preventing the transfer of metallic cry from the wall structure. In addition, in this modification also the air spaces may be sealed by means of some material, such as hydrolene, or other asphaltic material.

Figure 6:
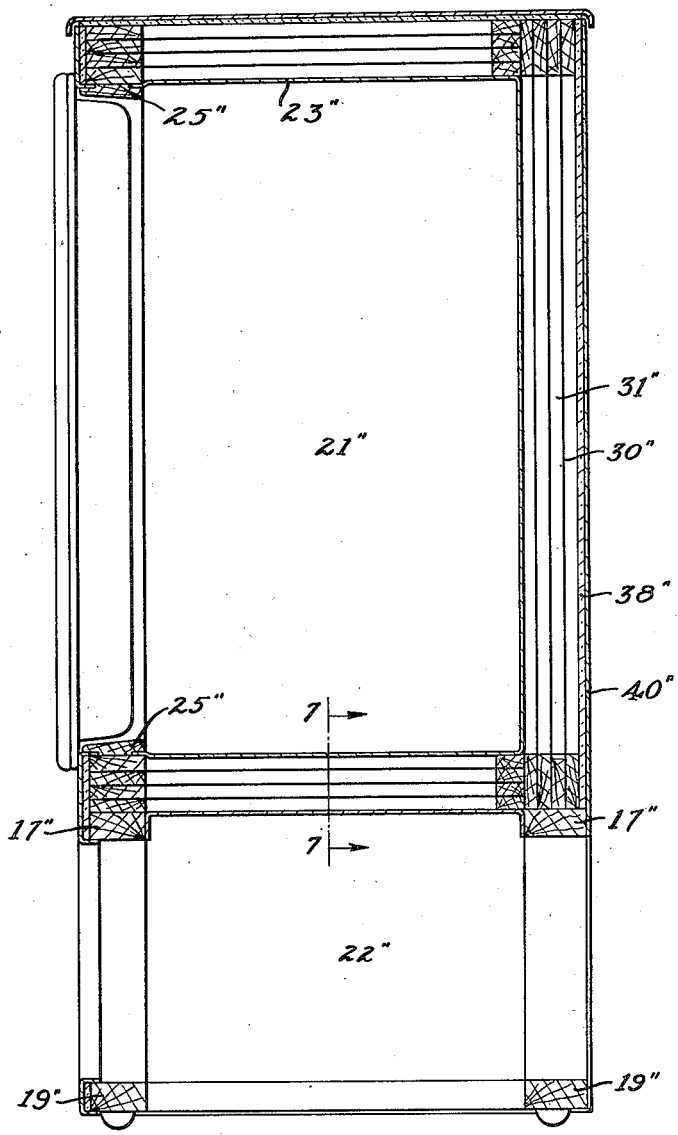
Fig. 6 is a vertical section through a cabinet showing a still further modified form of our invention.
Figure 7:
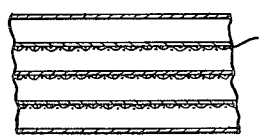
Fig. 7 is an enlarged view of a section of the wall structure shown in Fig. 6.

Referring now to Figs. 6 and 7, we have shown a still further modified form of our invention. In this modification, the parts that are similar to the parts shown in Figs. 1 and 2 are designated by the same reference characters double primed. In this modification the compartment 21'' has its walls insulated by means of a plurality of sheets of thin bright metallic foil 30'' spaced apart by means of non-conducting wood blocks to form the air spaces 31''. In this modification there is also disclosed the chip board 38'' for preventing the transfer of the metallic cry from the insulated walls. In addition to this means, however, we have disclosed a still further means for preventing the transfer of the noise due to the movement of the metallic foil. For instance, as disclosed in Fig. 7 there is in intimate contact with each sheet of aluminum foil a sheet of material, such as cheese cloth 98. This cloth may be secured to the sheets by pasting or any other convenient manner. It has been found that this cheese cloth will prevent the rattling of the foil, while, at the same time, will not destroy the radiating effect of the foil. This is probably due to the fact that the cloth is extremely thin and is provided with a large number of small openings therein.

Figure 8:
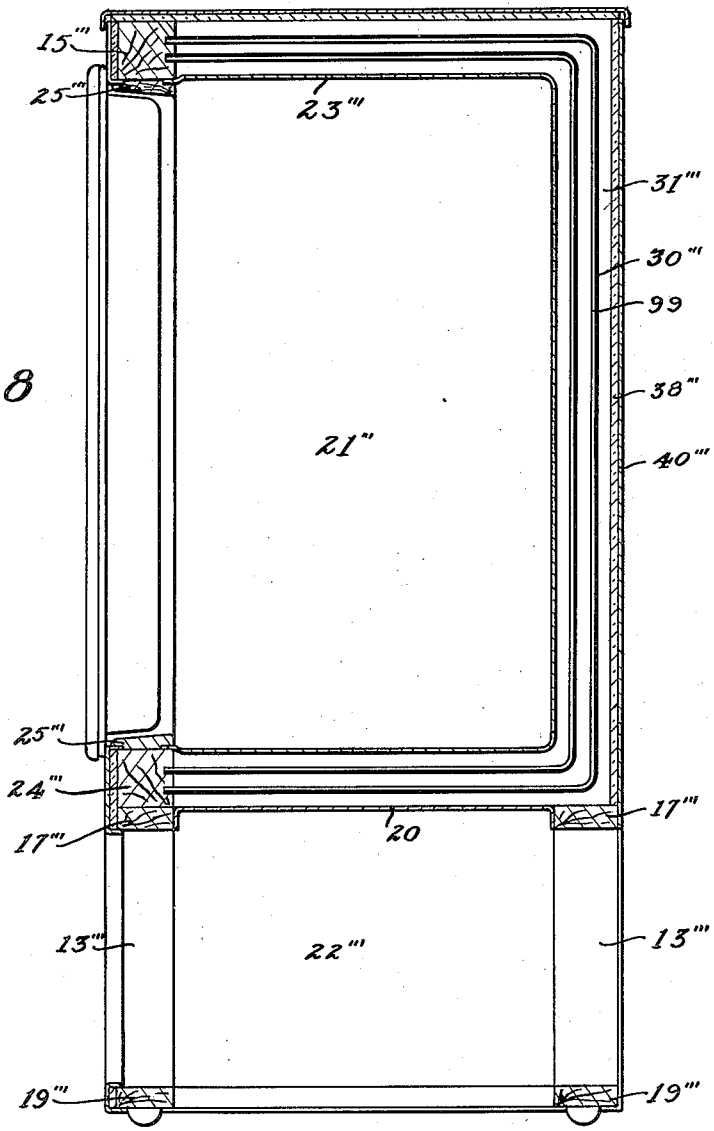
Fig. 8 is a vertical section through a cabinet showing another modification of our invention.

Referring now to Fig. 8, I have disclosed a still further modification of our invention. In this modification the parts that are similar to the parts shown in Figs. 1 and 2 have been designated by the same reference characters triple prime. In this modification the insulating walls are made up of a plurality of sheets of thin bright metallic foil, preferably aluminum foil designated by the reference character 30''', spaced apart to provide the air spaces 31'''. In this modification the sheets of thin bright aluminum foil are held in spaced relation by means of a plurality of substantially parallel lengths of wire extending across the top of the cabinet, down the rear of the cabinet and back along the lower wall of the cabinet. These wires are secured at their upper and lower edges to the front upper cross beam member 15''' and the intermediate cross beam member 24''', These wires are arranged in parallel relation and may be spaced apart a distance sufficient to hold the foil in a substantially firm position. Likewise, extending down the two sides of the cabinet are similar wires, it being understood that the side wires may be arranged to cross the wires in the upper and lower walls, if desired. The layers of thin bright aluminum foil 30''' are arranged lengthwise upon the corresponding wires so as to form one continuous sheet. These sheets may be secured to the wires in any convenient manner such, for instance as by pasting. Thus, in this modification there are shown sheets of thin bright metallic foil held in spaced apart relation by means of the plurality of parallel arranged wires. In this modification, as in the other modifications the chipboard 38''' may be used for deadening the metallic cry of the aluminum foil. Or, if desired, some other means, such for instance as that disclosed in Figs. 6 and 7 may be incorporated with the sheets of metal foil for the same purpose. When constructing a cabinet having heat insulated walls similar to those disclosed in Fig. 8, the use of the corner post members is optional.

If it is desired to construct the cabinet with corner frame members, for instance wooden frame members, then the wires may extend only between the frame members, if desired, rather than extending completely around the cabinet. While I have disclosed the use of parallel wires for supporting the aluminum foil, obviously wire gauze may be used, if desired in supporting the sheet of aluminum foil by means of wire or any other material it is necessary that its radiating surface or as much thereof as possible, be exposed to the air spaces between the sheets. That is, wire gauze would be acceptable provided it was of sufficient large mesh so as not to destroy the radiating surface of the aluminum foil.

Figure 9:
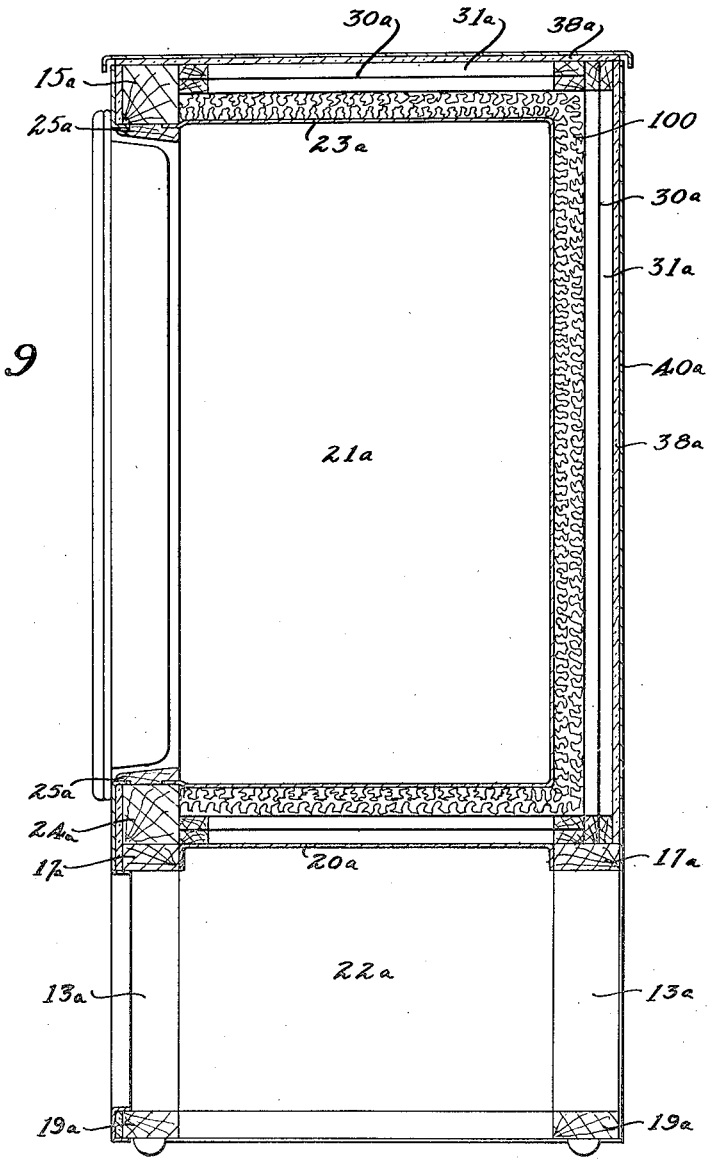
Fig. 9 is a vertical section through a cabinet showing another modification of our invention.

Referring now to Fig. 9, we have shown a still further modified form of insulated cabinet. In this modification the parts that are similar to the parts shown in Figs. 1 and 2 have been designated by the same reference characters followed by a. In this modification the heat insulated walls are composed of two substantially even sheets of thin bright aluminum foil 30a spaced apart to provide the air spaces 31a therebetween. In addition there is also provided a plurality of layers of thin bright metallic foil more or less crinkled as indicated by the reference character 100 to provide for an uneven radiating surface and for forming a plurality of unevenly bounded air spaces. By providing the crinkled sheets 100, it is possible to increase the amount of radiating surface by increasing the amount of aluminum foil utilized and at the same time to diminish the size of the individual air spaces bounded by the bright aluminum foil. In this modification, as in the prior modifications, the metallic cry from the aluminum foil may be diminished by the use of the chipboard 38a or in any other manner. In this modification also some substance such as hydrolene or other water excluding substance may be used to seal the various air spaces.

Referring now to Fig. 10, we have shown still a further modified form of refrigerator cabinet. In this construction parts similar to those shown in Figs. 1 and 2 are designated by the same reference characters followed by b. In this modification the wall structure is built up of a plurality of layers of thin bright aluminum foil substantially arranged in a crinkled arrangement and bound together by a plurality of wires 105 substantially surrounding the cabinet on all sides. In other words a plurality of layers of thin bright foil are secured to the top cross member 15b and are then wound about the top, back and bottom of the cabinet in an uneven and crinkled manner and finally secured to the lower cross member 24b. In like manner a plurality of crinkled sheets of the aluminum foil is used for the sides of the cabinet. The wire 105 may be a plurality of parallel wires arranged at a distance apart sufficient to hold the foil in its proper position. The foil on the two upright sides of the cabinet may be likewise secured in position by wires running in parallel arrangement around one side, thence around the back and along the other side to be secured in the upright wooden frame members, not shown on the drawings. In a similar manner wire gauze may be used in place of the individual wires, if so desired.

In Fig. 11 we have shown a wall structure made up of a plurality of channels, each channel being bounded by some non-conducting material such as paper. We have shown in Fig. 11 two sheets of channels indicated by the reference character 110 and 112 arranged in one direction and an intermediate sheet of channels 113 arranged transversely to the first set of channels. Each channel is surrounded by a sheet of thin bright metallic foil generally designated by the reference character 111, thereby providing a plurality of air spaces substantially bounded by the bright radiating surface of the metallic foil.

While throughout the specification mention has been made of thin bright metallic aluminum foil, it should be understood that any bright metallic surface may be used.

While in Figs. 1 and 2 we have disclosed a plurality of individual tubular members, it should be understood that these tubular members may be formed in other ways. For instance a plurality of parallel strips of cardboard having interrelated a plurality of transverse strips of cardboard similar to an egg crate may be utilized to form a plurality of minute air spaces. In other words, instead of individual tubular members, a plurality of tubular members may be built up from an integral structure.

It should also be understood that while we have mentioned air spaces as defined by the thin bright metallic foil, that other gases such as carbon dioxide and gases having a low conductivity may be used in the spaces between the sheets of foil.

While the form of embodiment of the invention as herein disclosed constitutes a preferred form, it is to be understood that other forms might be adopted, all coming within the scope of the claims which follow.

What is claimed is as follows:

1. An insulating structure having a chamber to be kept cool and inner and outer walls insulated from each other and surrounding the chamber, said structure having a plurality of insulating units between the inner and outer walls, said units comprising a plurality of thin flexible sheets having bright metal surfaces held in spaced relation and insulated from each other by structural members of non-conducting material extending around the edges of the sheets, at least one of the sheets having a bright metal surface on both sides thereof for reflecting radiant energy, the edges of said sheets being held between the structural members enclosing air cells between the sheets, said structural members and sheets being stacked and fastened together to form a unit insertable and removable from the structure as a unit, said air cells being sealed by a waterproof substance to exclude external air and moisture.

2. An insulating structure having a chamber to be kept cool and inner and outer walls insulated from each other and surrounding the chamber, said structure having a plurality of insulating units between the inner and outer walls, said units comprising a plurality of thin flexible sheets held in spaced relation and insulated from each other by structural members of non-conducting material extending around the edges of the sheets, at least some of said sheets having a bright metal surface on both sides thereof for reflecting radiant energy, the edges of said sheets being held between the structural members, said structural members and sheets being fastened together to form a unit insertable and removable from the structure as a unit, said structural members at the edges of said units being formed to fit together at the edge portions of the chamber.

3. An insulating structure having a chamber to be kept cool and inner and outer walls insulated from each other surrounding the chamber, said structure having a plurality of insulating units between the inner and outer walls, said units comprising a plurality of thin flexible sheets held in spaced relation and insulated from each other by members of non-conducting material providing air spaces between the sheets, at least some of said sheets having a bright metal surface for reflecting radiant energy so that each air space may have a bright metal surface on at least one side, said units being insertable and removable from the structure as a unit, the edges of said units being beveled adjacent the edges of the chamber so that the edges of the units will fit together.

4. An insulating structure having a chamber to be kept cool and inner and outer walls insulated from each other surrounding the chamber, said structure having a plurality of insulating units between the inner and outer walls, said units comprising members of non-conducting material, a thin flexible sheet having a bright metal surface on both sides thereof stretched over said members and having its marginal portions fastened thereto by an adhesive, a second set of members on the opposite side of said sheet from the first mentioned members and fastened to the sheet by an adhesive, and a second sheet stretched over the second set of members and fastened thereto by an adhesive.

5. An insulating structure having a chamber to be kept cool and inner and outer walls insulated from each other surrounding the chamber, said structure having a plurality of insulating units between the inner and outer walls, said units comprising a plurality of thin flexible sheets held in spaced relation by members of non-conducting material providing enclosed air spaces between the sheets, at least some of said sheets having a bright metal surface on both sides thereof for reflecting radiant energy, said units being stepped at some of their edges so that the adjacent edges of the insulating units located in different wall portions of the chamber will interfit, said air spaces being sealed by a moisture excluding material.

6. An insulating structure having a chamber to be kept cool and inner and outer walls insulated from each other and surrounding the chamber, said structure having a plurality of insulating units between the inner and outer walls, said units comprising a plurality of thin flexible sheets held in spaced relation and insulated from each other by structural members of non-conducting material extending around the edges of the sheets, at least one of said sheets having a metallic heat reflecting surface on both sides thereof for reflecting radiant energy, the edges of said sheets being held between the structural members, said structural members and sheets being fastened together to form a unit insertable and removable from said structure as a unit, the outer portions of said unit enclosing the air spaces between the sheets so as to form substantially dead air spaces.

7. An insulating structure including inner and outer walls substantially surrounding a chamber to be insulated, said structure having a plurality of insulating units between the inner and outer walls, each of said units comprising a plurality of thin flexible sheets held in spaced relation and insulated from each other by structural members of non-conducting material extending around the edges of the sheets to form air spaces between adjacent sheets, at least one of said sheets in each unit having both sides exposed to air spaces and having a heat reflecting surface for reflecting radiant energy, the edges of said sheets being held between the structural members, said structural members and sheets being fastened together to form a unit insertable into and removable from said structure as a unit, the outer portions of said unit enclosing the air spaces between the said sheets.

FREDERIC L. CHASE.
STANLEY V. COOK.